United States Patent [19]
Robinson

[11] 3,863,020
[45] Jan. 28, 1975

[54] METHOD OF PREPARING A GROUND MEAT PATTIE FOR STORAGE AND TRANSPORTATION

[76] Inventor: John B. Robinson, Summerdale, Ala.

[22] Filed: Nov. 30, 1973

[21] Appl. No.: 420,642

Related U.S. Application Data

[63] Continuation-in-part of Ser. No. 11,140, Feb. 13, 1970, abandoned.

[52] U.S. Cl................. 426/513, 426/144, 426/393, 426/420
[51] Int. Cl.............................................. A22c 7/00
[58] Field of Search........... 426/132, 144, 149, 420, 426/513, 393; 99/349, 400; 17/32

[56] References Cited
UNITED STATES PATENTS
255,380  3/1882  Dodson............................. 99/400
3,269,846  8/1966  Wattenbarger..................... 426/393

*Primary Examiner*—Hyman Lord
*Attorney, Agent, or Firm*—Berman, Bishoff & Platt

[57] ABSTRACT

A ground raw meat pattie is prepared for storage, transportation, or cooking by pressing a series of concentric circular ribs separated by narrow circular grooves into the top and bottom of a pre-selected quantity of ground meat to form a thin round pattie having said ribs and grooves in its upper and lower surfaces. The thus formed pattie is covered by a plastic wrapper which desirably has the same ribs and grooves pressed therein simultaneously with forming of the meat pattie. The wrapped pattie may be frozen and stored and subsequently transported. Prior to use, the frozen wrapped pattie is thawed and stripped of its wrapping. The stripped pattie may then be cooked on a flat heating surface and will retain its shape without need for other support, or cooking implement.

6 Claims, 8 Drawing Figures

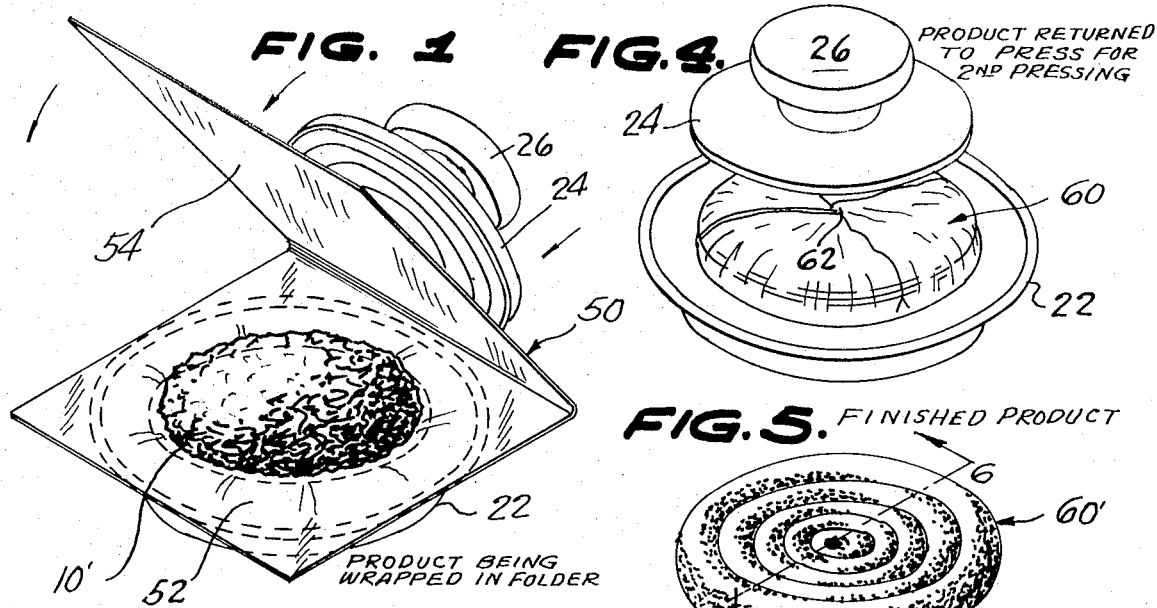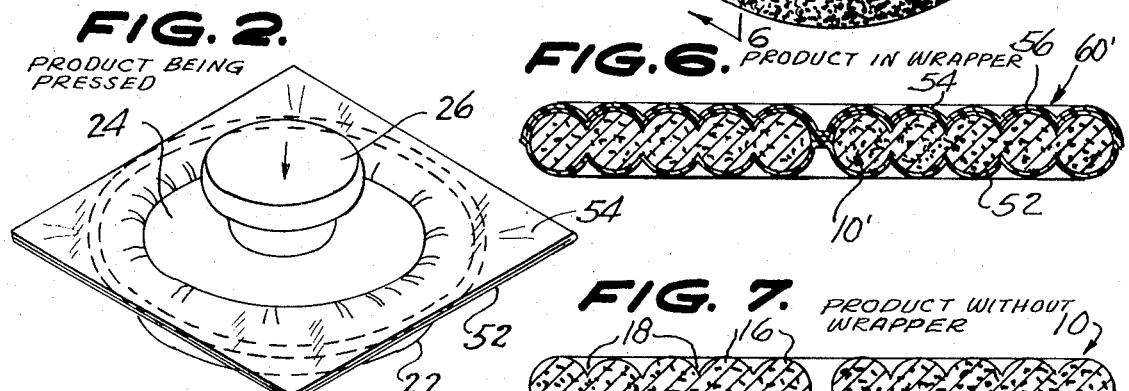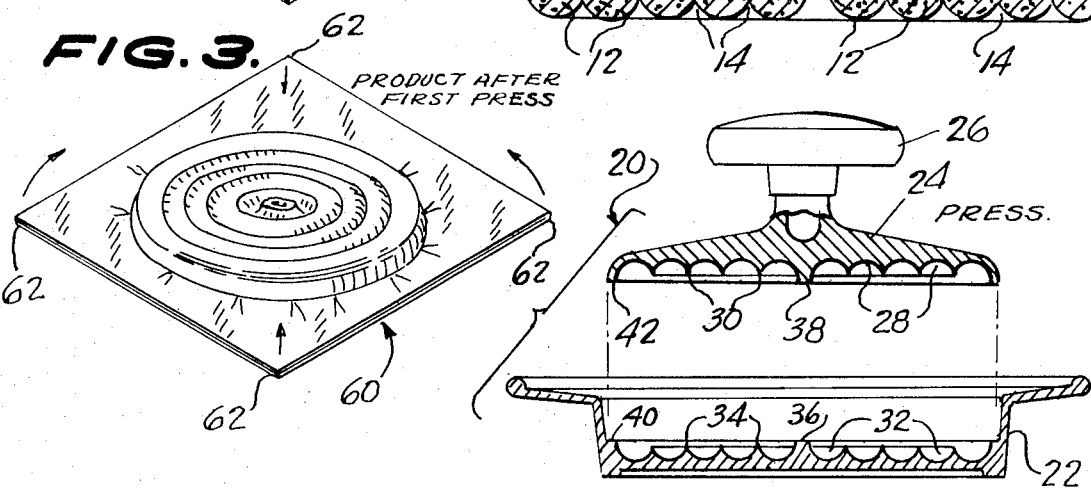

METHOD OF PREPARING A GROUND MEAT PATTIE FOR STORAGE AND TRANSPORTATION

This application is a continuation-in-part of my co-pending application Ser. No. 11,140, filed Feb. 13, 1970, and entitled, MEAT PATTIE AND MOLD FOR SAME now abandoned.

The invention relates to a mode of preparing a ground meat pattie for storage, transportation, or cooking, with particular respect to the general type of patties known as hamburgers.

The United States makes and consumes millions of hamburgers each year in restaurants, private homes and chains of outlets devoted primarily to this food product. Despite this tremendous usage and the great number of people involved in supplying the meat, preparing and cooking the hamburgers and consuming the same, they continue to be formed usually as round flat discs of ground meat, shaped by hand, having very little strength to withstand the stresses of handling, turning, and heating which are imposed upon the hamburger patties from the time they are formed to the time they are consumed. The hamburger patties are very apt to cup, crack, warp, or even break up while being cooked, or by being handled prior to cooking, during cooking, and during subsequent consumption.

It is a primary object of this invention to provide a method of preparing a ground meat pattie which will overcome the disadvantages of conventional hamburger patties as briefly outlined above.

It is another important object of this invention to provide a ground meat pattie which will have adequate structural strength to withstand handling, turning, heating and the stresses or other distorting forces which may be imposed on the pattie from the time it is formed to the time it is consumed.

Yet another object of the invention is to provide a ground meat pattie having a series of concentric circular ribs separated by narrow circular grooves in the upper and lower surfaces thereof so as to strengthen the same and which will, therefore, remain flat while cooking and will be less apt to cup, crack, warp, or break up while being subjected to the stresses of heat during cooking.

It is a further object of this invention to provide a ground meat pattie, having the above-described characteristics, which is conveniently molded into the circular ribbed conformation and which is packaged and wrapped in a plastic film.

Still another object of the invention is to prepare a ground meat pattie, having the above-described configuration and and characteristics, which can be frozen in less time under given freezing conditions than will be required for freezing a conventional ground meat pattie of the same size, weight and like content.

Yet a further object of the invention is to provide a ground meat pattie, having the above-described characteristics, which will thaw faster than a conventional ground meat pattie.

Yet a still further object of the invention is to provide a ground meat pattie, having the above-described characteristics, which will cook faster than a conventional ground meat pattie and yet will improve the taste of the cooked product.

The above and additional objects will be made clear from the following detailed description when taken in connection with the annexed drawing, in which:

FIG. 1 is a perspective view of a quantity of ground meat placed between an upper and lower layer of plastic wrapping material and disposed in the bottom half of a mold just prior to pressing both the meat and the wrapper material into the desired configuration of the invention with the upper half of the mold;

FIG. 2 is a perspective view similar to FIG. 1, but with the upper half of the mold lowered and pressing upon the meat and plastic wrapper;

FIG. 3 is a perspective view of the pressed and formed meat pattie coated with its plastic wrapper and removed from the mold after the first press;

FIG. 4 is a perspective view of the formed meat pattie after the corners of the wrapper material have been refolded over it and the pattie has been replaced in the mold for a subsequent second pressing;

FIG. 5 is a perspective view of the doubly pressed and wrapped meat pattie when removed from the mold after the second press;

FIG. 6 is a cross-sectional view taken along line 6—6 of FIG. 5 and looking in the direction of the arrows;

FIG. 7 is a view similar to FIG. 6, but with the wrapper removed; and

FIG. 8 is a vertical sectional view through the mold alone with the upper and lower halves disposed apart in exploded relation.

The product intended to be achieved with the method of the present invention is best seen in FIG. 7 and comprises a circular disc 10 of molded ground meat having a plurality of concentric rings 12 nestled one within the other. Each of the rings 12 is approximately circular in cross-section, but need not be exactly, and the adjacent rings are joined by molded meat connections 14 which are formed during the molding operation between adjacent crests or ribs 16 and between grooves 18.

A suitable mold which may be used for pressing the meat pattie, by a housewife, for example, is best seen in FIG. 8 as comprising a mold 20 having a lower half 22 and an upper half 24 which carries a handle 26.

As best seen in FIGS. 1 and 8, the upper half mold 24 has formed in it a series of concentric grooves 28 which are preferably approximately semicircular in cross-section with adjacent grooves intersecting in crests 30.

The lower portion 22 of the mold is similarly grooved at 32. The grooves 32 register with the grooves 28. The crests 30 of the grooves 28 oppose the crests 34 of the lower half portion of the mold. When the mold is closed, as by lowering the top half portion in FIG. 8, the crests 30 are spaced from the crests 34 of the grooves 32 except at the center where a circular post 36 of the mold bottom 22 registers with and contacts a similar post 38 in the mold top 24. An annular ledge 40 of the lower part of the mold 22 registers with an annular edge 42 in the upper part of the mold 24.

With the upper part of the mold 24 separated from the lower part 22, as in FIG. 8, the user may directly place a predetermined quantity of uncooked raw ground meat, such as hamburger, sausage, meat loaf, etc., in the lower half 22 and the upper half 24 pressed downwardly upon said quantity of meat so as to fill the grooves 28,32 and form a substantial layer above the crests 34. During pressing the upper mold downwardly, the handle 26 may be rotated to provide a pressing or "ironing" action which compacts the meat within the grooves and in the spaces between the crests 30 and 34.

The top part of the mold 24 is then withdrawn and the product shown in FIG. 7 is extricated from the lower part of the mold 22.

During the molding step, the concentric ribs and grooves of the molding device 20 compress the ground meat into a disc formed of concentric rings 12 joined by thin, or narrow meat connections 14 formed between the adjacent crests 30 and 34, thus imparting to the pattie a configuration of very desirable characteristics. The compressing action serves to remove much of the air from the ground meat, thereby increasing its internal cohesive strength. This, when coupled with the increase in inherent strength gained by the rib construction formed by the multiple, connected circular rings, results in a pattie of unusually good structural strength which holds up very well under the distorting stresses likely to be imposed upon it after forming and during possible freezing, storage, thawing, cooking and consumption.

The configuration of the top and bottom surfaces of the meat pattie 10, with their alternate concentric ribs and grooves, form surface areas which may be mathematically proven to be more than 40 percent greater than the like surface areas of a flat, or conventional pattie formed of like ground meat and of the same diamater and weight. The ability of substances to absorb, or release heat, with other things being equal, varies directly with the area exposed. Therefore, the concentric ring meat pattie 10 of this invention will cook, freeze, or thaw faster than conventional patties of the same content, diameter and weight. Actual test experience has proven this to be true. In fact, the actual time needed to freeze, or thaw, is less than expected based on the area difference alone. This is probably explained by the increased density of the patties 10 resulting from the compressive action of a mold such as that illustrated in FIG. 8. During cooking in a skillet, or on a flat heating, or cooking surface, the cooking time for the patties 10 has proven to be less than one-half that required to cook a conventional ground meat pattie of the same material, overall diameter and weight to the same degree of doneness. This, again, is made possible by the more than 40 percent greater surface area of pattie 10, its improved density, resulting from compressive action, (density being an important factor controlling heat transfer within the pattie, itself) and the fact that the pattie 10 remains flat on the cooking surface during the entire time of cooking. While lying flat, the hot, exuded cooking juices are trapped under the pattie and fill the concentric grooves 18 which greatly improves transfer of heat from the cooking surface to the pattie, itself. Further, the retention of these juices improves the taste of the cooked patties. Moreover, the action of the grooves 18 holding exuded hot meat juices both under and on top of the concentric rings, or ribs 12 during cooking tends to reduce sticking, burning in spots and generally contributes to a tender, juicy and delicious end product. It has been found that during cooking the meat patties 10 are not likely to cup, crack, warp or break up as frequently happens with conventional ground meat patties. This statement applies to handling, storage, transportation and similar actions taken with the patties before, or after cooking. The reason for this improved strength and improved action under cooking forces is explained by the basic structure of the pattie, which is being composed of multiple, connected, circular rings of ground meat with well-defined matching circular grooves formed in the meat surface on each side. These grooves act to cut the continuous lines of shrinkage force, which are set up across the flat surface of conventional patties as they cook, causing such conventional patties to cup, crack, warp, distort, or break up. The shrinkage forces in the patties 10 having concentric ribs are, in the main, confined to each circular ring of meat, each ring 12 shrinking uniformly and independently in such a way as to not to noticeably disturb its relationship with other rings in the pattie. An additional factor in the increase of pattie strength is the result of the compressive action of the circular ribs and grooves in the mold which combine to squeeze much of the air from the ground meat and to form it into a denser pattie of higher cohesive strength.

A mold device such as 20, FIG. 8, makes it possible and practible to simultaneously pressure mold the ground meat to the desired pattie form and apply a contour-fitting, skin-tight, hygienic, easy to handle and easily removed, relatively vaporproof plastic film covering to the entire outer surface of the meat pattie 10. Such a film is illustrated in FIGS. 1 - 6, as will be later explained. The plastic material from which the wrapper film is made must have essential characteristics of flexibility, stretchability, impermeability to liquids and vapors as well as the ability to cling to the meat when applied with a molding press. Suitable examples of such plastic film are carried under the tradenames, "Handi-Wrap," "Stretch'N Seal," and "Saran Wrap."

To form and utilize the plastic film wrapper in a home, for example, one end 52 of a strip of the plastic material 50 approximately 6 ×12 inches is laid over the mold base 22 and the desired quantity (2½ to 4 ounces) of the ground meat 10' is placed on this end portion 52 of the strip of plastic. The other end 54 of the plastic film is folded over the meat and firmly pressed downwardly by the upper mold half 24 into the base section of the mold, as illustrated in FIG. 2, simultaneously pressing concentric ribs into both the plastic film and into the ground meat. The thus formed and covered pattie 60 is then removed from the mold base 22 as illustrated in FIG. 3.

If desired, the corners 62 of excess plastic material may be folded upwardly and inwardly to overlie the pattie as indicated by the arrows in FIG. 3, and the wrapped pattie 60 is then returned to the mold as in FIG. 4, preparatory to repressing the same for a second time. After the second pressing the formed pattie 60' with the plastic wrapping is removed from the mold and takes the appearance shown in FIG. 5. As will be seen from FIG. 6, the ground meat has been formed into the circular ribbed configuration described above and is surrounded on its bottom by a single layer of plastic material 52 and on portions of its top by double layers of the plastic material 54,56.

The formation of the meat pattie 60' closely covered by plastic material 50, having the same ribbed configuration pressed into the plastic, enables the pattie to be easily removed from the mold without meat sticking to the mold surfaces. The pattie can be readily handled in a hygienic manner without danger of contamination of the meat by unwanted and unsafe materials through handling, and the patties may be stored for a long period of time safely and hygienically.

Storage of the meat pattie may be safely extended for a longer period of time by freezing the meat pattie in its covering, thereby preventing decomposition likely to occur at higher, or normal temperatures. When the frozen patties are ready to be removed from storage in preparation for cooking and consumption, the patties are merely allowed to thaw to room temperature in their plastic wrappers, and the wrappers are then stripped off by lifting away the four folded corners 62 and thereafter separating the two upper and lower plastic leaves 52,54 from the meat. This is a relatively easy operation to perform and once done, the meat pattie 10' now unwrapped will appear as described in FIG. 7, and may be placed on a flat heating surface to cook the same in the manner previously described. It will be apparent that the pattie 10' retains its circular ribbed construction throughout the storage, transporting, freezing and thawing operations while wrapped in the plastic material and when the wrapper is stripped therefrom, still retaining its ribbed construction, may be cooked with all the attendant advantages of such shape and configuration as has been previously described.

The complete method of preparing a ground meat pattie for storage, transportation, and/or cooking as has been described above, may be summarized as including the following steps:

1. Separating a predetermined quantity of ground meat from a larger supply of ground raw meat,
2. pressing or molding a series of concentric circular ribs separated by narrow circular grooves in the top and bottom of said quantity of ground meat to form a thin round pattie with said circular concentric ribs and grooves in both its upper and lower surfaces,
3. simultaneously with said pressing step (2) pressing an upper and lower layer of plastic film with the meat to simultaneously form the pattie with a close-fitting wrapper of plastic material,
4. removing the wrapped and pressed pattie from the mold and folding excess plastic material to overlie the pattie,
5. re-pressing the pattie with the folded wrapper thereon in the same mold, or pressing device,
6. removing the pattie as re-pressed from the molding device,
7. subjecting the wrapped and pressed patties to freezing temperature for storage, or transportation,
8. thawing the wrapped frozen patties to room temperature, or thereabouts,
9. stripping the plastic wrapper from the ground meat pattie,
10. and cooking the stripped ground meat pattie on a flat heating surface without support of any other supporting device, or implement.

In the above-described process certain steps may be modified, or omitted, if desired. For example, the meat and wrapper need be pressed only once. Again, the pattie may be formed from ground meat directly in the mold without a wrapper and removed from the mold and placed directly on the heating surface for cooking. Other variations of the method and method steps are obviously possible.

While the invention has been described in relation to a use by a single person, a housewife for example, and by use of a simple mold which may be retained and used in an ordinary kitchen, the method of the invention may obviously be adapted to large quantity production, mechanization, and the like. A commercial meat packer, for example, may utilize machinery capable of molding dozens, if not hundreds of the patties simultaneously. Plastic film may be applied as a wrapper automatically by use of a two ply continuous plastic belt. The wrapped patties may be fast frozen in continuous operation and may then be stored for relatively long periods of time and transported over a great distance with minimal loss in quality. The plastic belt wrappers may be perforated between patties which would simplify marketing by allowing purchasers to conveniently serve themselves from a packer's shipping box by pulling out and tearing off a desired number of patties. Further modifications will occur to those skilled in the art. For example, although the ribs forming the rings of the patties, as described above, are shown to be substantially circular in cross-section, they are not limited to this shape, but may be somewhat elliptical, or even approximately hexagonal to yield superior release of the pattie from the mold.

Although a certain specific embodiment of the invention has been shown and described, it is obvious that many modifications thereof are possible. The invention, therefore, is not intended to be restricted to the exact showing of the drawing and description thereof, but is considered to include reasonable and obvious equivalents.

What is claimed is:

1. The method of preparing a ground meat pattie for storing and transporting comprising the steps of:
    1. separating a predetermined quantity of ground meat from a larger supply of ground raw meat, and
    2. pressing a series of concentric circular ribs separated by narrow circular grooves in the top and bottom of said quantity of ground meat to form a thin round pattie having said circular concentric ribs and grooves in its upper and lower surfaces, whereby said pattie is strengthened to withstand stresses in handling, storage, transporting and ultimate cooking.

2. The method of preparing a ground meat pattie as recited in claim 1, wherein said quantity of ground meat is covered on top and bottom by a flexible and stretchable layer of plastic film and said plastic film is simultaneously pressed with the meat to form said pattie with said circular concentric ribs and grooves, whereby the formed pattie is wrapped in a plastic covering also having concentric ribs and grooves on its upper and lower sides which fit closely the ribs and grooves of the meat pattie.

3. The method of preparing a ground meat pattie as recited in claim 2, wherein said plastic covering is stripped from the upper and lower sides of the pattie prior to cooking, and said pattie is cooked on a substantially flat heating surface.

4. The method of preparing a ground meat pattie as recited in claim 2, wherein said layers of plastic film have larger areas than said formed pattie and the excess plastic material is folded over the pattie followed by another step of pressing substantially the same sized and shaped circular ribs and grooves into the pattie with the folded wrapper of plastic thereon.

5. The method of preparing a ground meat pattie as recited in claim 2, wherein is added the step of freezing the formed meat pattie while wrapped in its plastic covering.

6. The method of preparing a ground meat pattie as recited in claim 5, wherein is added the steps of thawing the wrapped meat pattie, stripping the plastic covering from the thawed pattie, and cooking the stripped pattie on a substantially flat heating surface.

* * * * *